(12) United States Patent
Nagao et al.

(10) Patent No.: US 8,151,765 B2
(45) Date of Patent: Apr. 10, 2012

(54) ENGINE INTAKE SYSTEM

(75) Inventors: Tokinari Nagao, Shizuoka (JP); Atsushi Sawabuchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 758 days.

(21) Appl. No.: 12/353,350

(22) Filed: Jan. 14, 2009

(65) Prior Publication Data

US 2009/0194054 A1 Aug. 6, 2009

(30) Foreign Application Priority Data

Jan. 31, 2008 (JP) ................................. 2008-021534

(51) Int. Cl.
*F02M 3/06* (2006.01)
(52) U.S. Cl. ............................... 123/339.1; 123/184.21
(58) Field of Classification Search ............... 123/198 E, 123/184.21, 337, 339.1, 339.14, 339.27, 123/585; 251/305
See application file for complete search history.

(56) References Cited

U.S. PATENT DOCUMENTS

| 4,164,914 A | * | 8/1979 | Hattori et al. ................. 123/587 |
| 5,687,695 A | | 11/1997 | Tsukamoto et al. |
| 7,140,347 B2 | * | 11/2006 | Suzuki et al. ................. 123/586 |

OTHER PUBLICATIONS

Nagao et al.; "Air Intake Device of Engine"; U.S. Appl. No. 12/353,360, filed Jan. 14, 2009.

\* cited by examiner

*Primary Examiner* — Noah Kamen
(74) *Attorney, Agent, or Firm* — Keating & Bennett, LLP (57) ABSTRACT

In an engine intake system, an air cleaner and downstream sides of throttle valves in throttle bodies provided in intake passages are connected by bypass passages. An idle speed control apparatus provided at a midpoint of the passage controls amounts of air supplied during an idling operation. End portions of the bypass passages connected to the throttle bodies are located in higher positions than end portions of the bypass passages connected to the air cleaner so that the bypass passages are inclined downward toward the air cleaner. As a result, water is prevented from blocking the bypass passages via a simple structure.

11 Claims, 6 Drawing Sheets

ENGINE INTAKE SYSTEM

BACKGROUND OF THE INVENTION

1. Field of the Invention

The present invention relates to an engine intake system.

2. Description of the Related Art

Known idle-speed control apparatuses control an idle speed of an engine to a target idle speed according to the conditions of the engine. For example, in the device disclosed in Japanese Patent Application Laid-Open Publication No. 9-42119, a base portion protrudes from a throttle body and an idle-speed control apparatus is mounted to the base portion. The base portion contains a water reservoir at a midpoint in a bypass passage from the idle-speed control apparatus to a bore in the throttle body so that drops of water from condensation in the throttle body and from air cleaner piping can be temporarily stored therein. In this way, it is possible to prevent water from blocking the bypass passage in order to reliably supply bypass air.

In the technique described above, however, the water reservoir is formed by partially extending the bypass passage. Because space for additionally forming the water reservoir is required, the bypass passage structure may increase in size. If special members for the water reservoir are provided, the number of parts increases and the intake system becomes complicated.

SUMMARY OF THE INVENTION

In view of the problems described above, preferred embodiments of the present invention provide an intake system that reliably supplies bypass air via a simple structure.

According to a preferred embodiment of the present invention, an engine intake system includes an intake passage which connects an air cleaner and an engine and through which air flows downward toward the engine, a throttle body mounted in the intake passage, and a bypass passage arranged to connect a downstream side of a throttle valve provided in the throttle body and the air cleaner. The bypass passage is arranged so that an end portion connected to the air cleaner is lower than another end portion connected to the throttle body and such that a portion between the end portions is generally inclined downward toward the air cleaner.

According to a preferred embodiment of the present invention, water that enters the bypass passage flows down toward the air cleaner and does not block a midpoint of the bypass passage. Therefore, it is possible to reliably secure bypass air for idle control. Moreover, with a simple structure where the end portion of the bypass passage connected to the throttle body is higher than the end portion of the passage connected to the air cleaner, it is possible to avoid blockage in the bypass passage.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

First Preferred Embodiment

Figure 1:
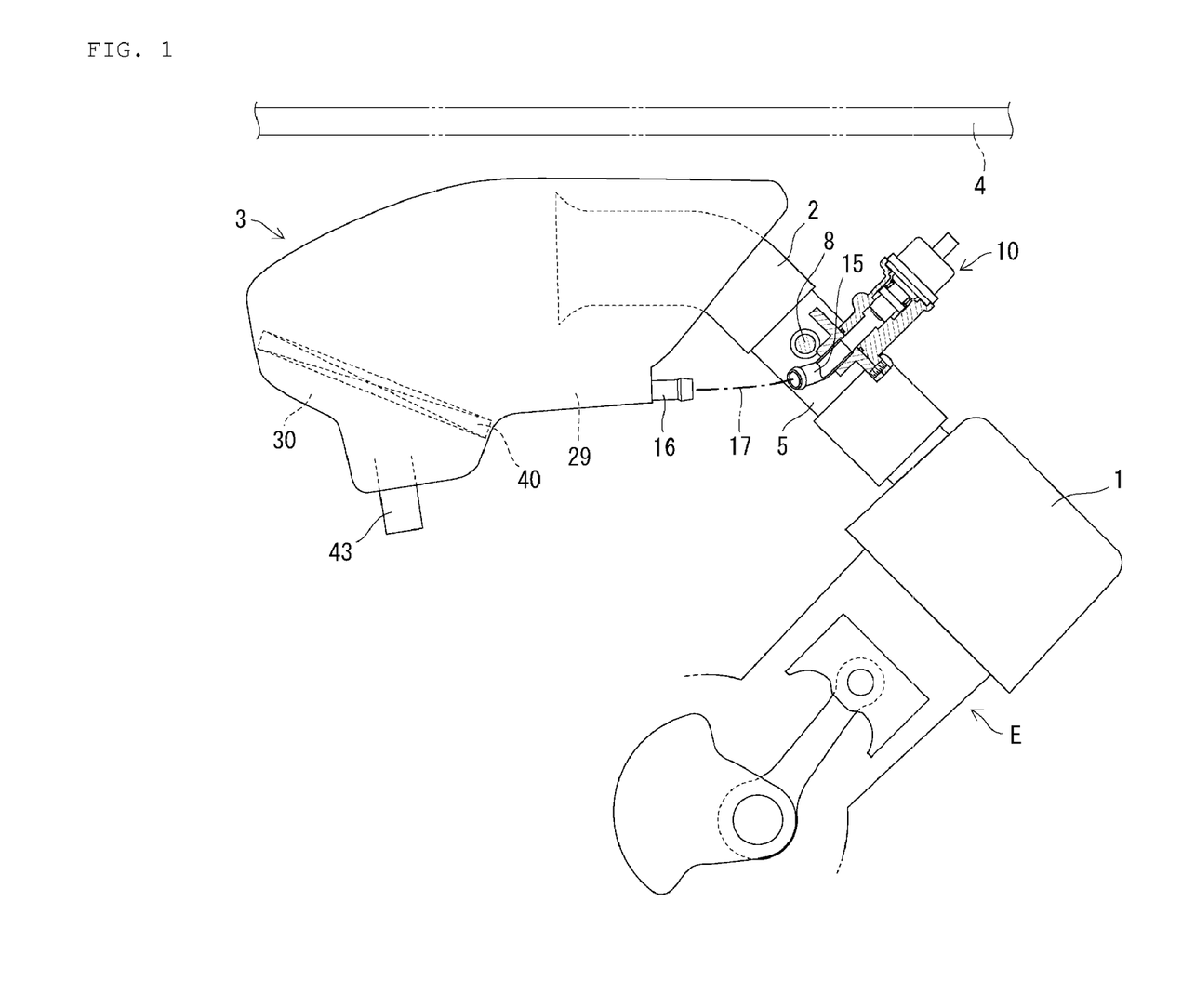
FIG. 1 is a front view of an overall layout of an intake system.
Figure 2:
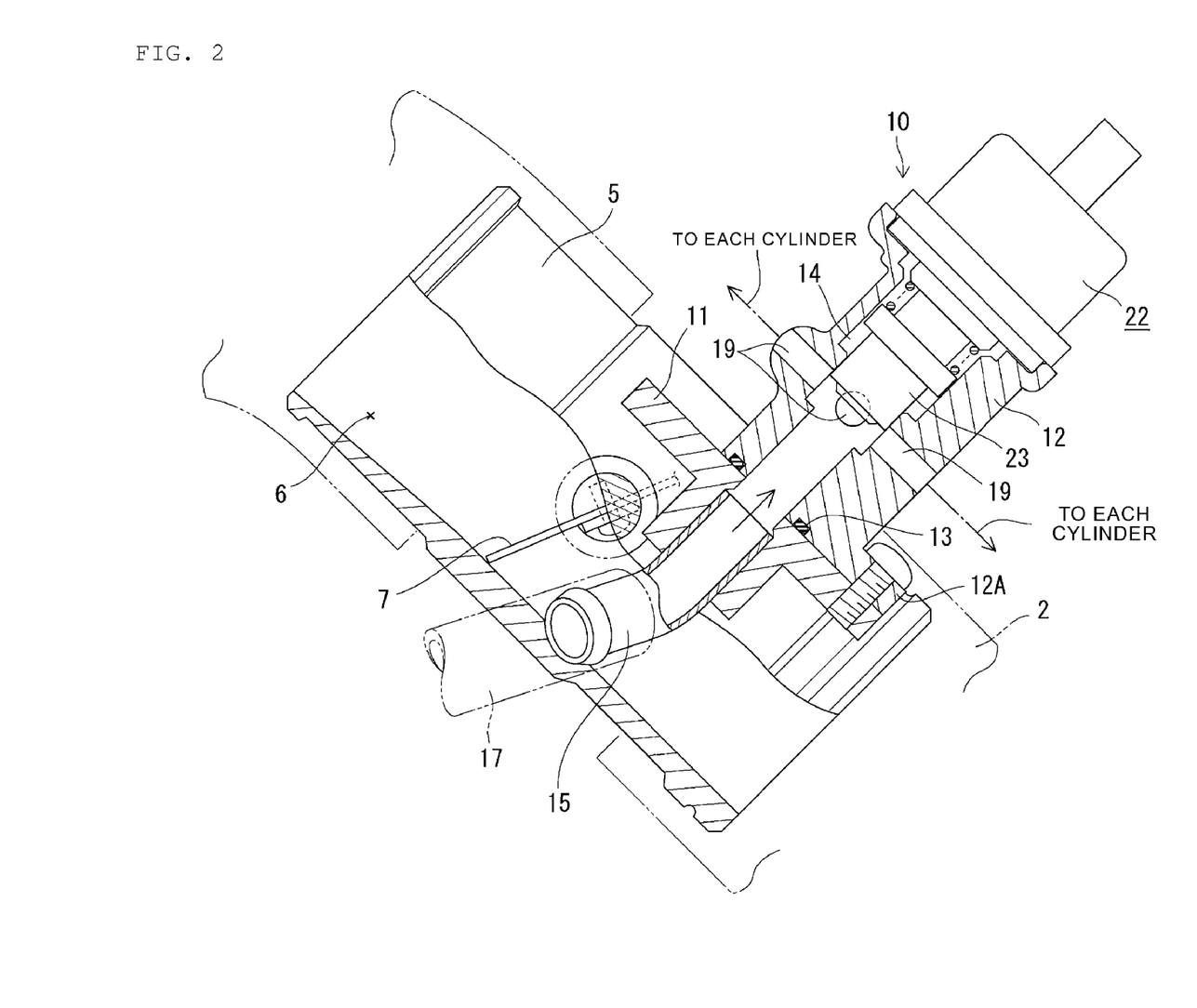
FIG. 2 is a sectional view of an idle-speed control apparatus.

A first preferred embodiment of the present invention will be described with reference to FIGS. 1 to 6. FIG. 1 shows an essential portion of an intake system preferably applied to an engine E of a snowmobile, for example. A vehicle in the present preferred embodiment preferably has an engine having four cylinders arranged parallel in a direction perpendicular to the surface of FIG. 1 (a vehicle width direction), each of the cylinders disposed with its axis inclined diagonally rearward. One end of each intake pipe 2 is connected to a cylinder head 1 of each cylinder and the other end of each intake pipe 2 is connected to an air cleaner 3. The whole engine E including the air cleaner 3 is housed in an engine department and covered from above with a hood 4 (cover) that can be opened and closed.

A throttle body 5 is preferably interposed approximately at a midpoint in each intake pipe 2 and a bore inside the throttle body 5 defines a portion of an intake passage 6 extending from the air cleaner 3 to the engine E. The throttle body 5 is arranged at an attitude slightly inclined rearward with respect to a front-rear direction of the vehicle. Inside the throttle body 5, a throttle valve 7 is mounted for turning around a support shaft 8 and can open and close the inside intake passage 6 in synchronization with throttle operations. Although it is not shown in the drawings, an opening degree of the throttle valve 7 is detected by a throttle opening degree sensor and a detection signal is input to an engine control unit (ECU)(not shown).

Figure 6:
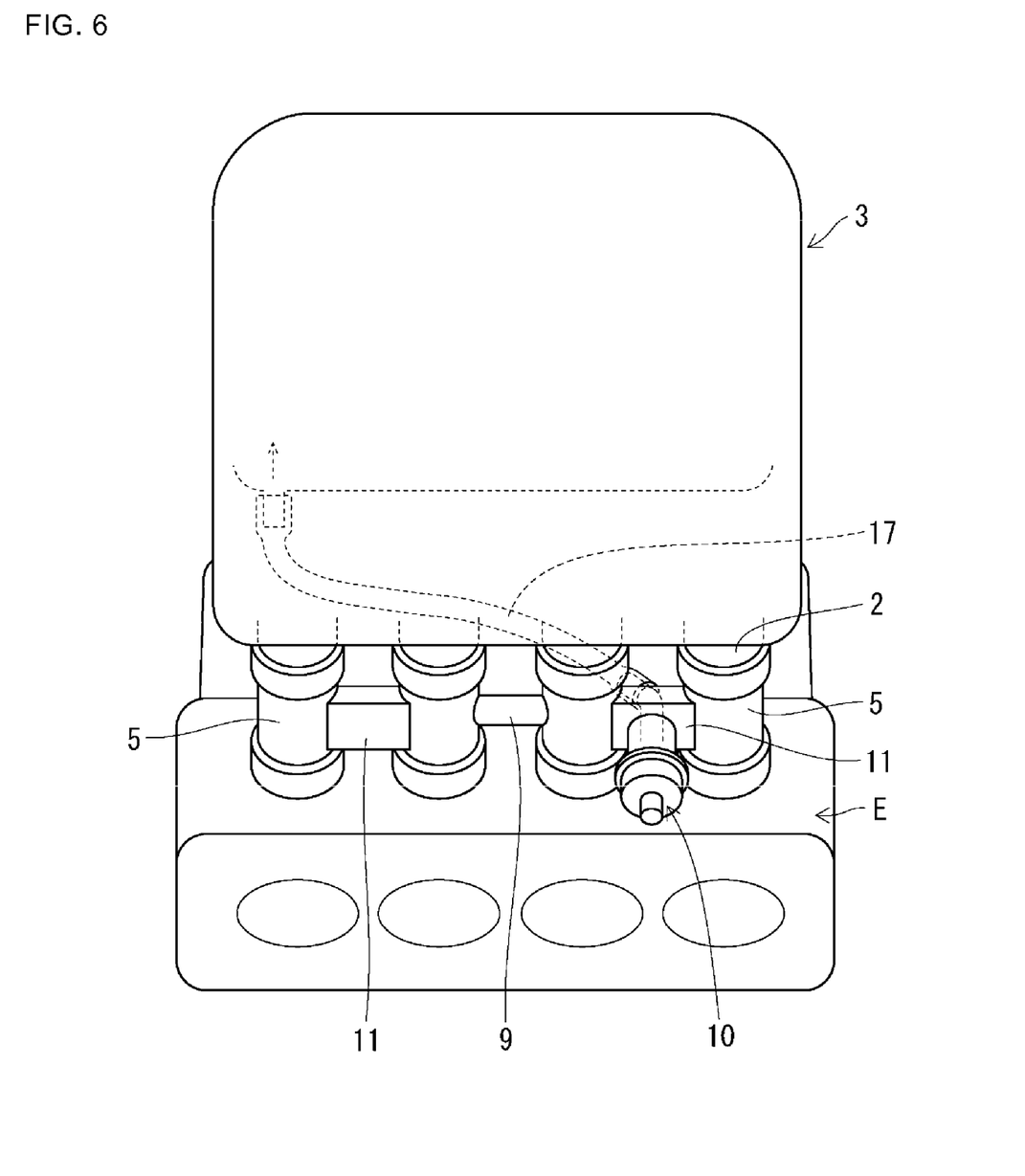
FIG. 6 is a plan view of an installed state of the bypass passage.

As shown in FIG. 6, the throttle bodies 5 are preferably arranged integrally in pairs. A joining member 9 couples both of the pairs to thereby define a unit structure where four throttle bodies 5 in total are arranged side by side at equal intervals.

One of the both pairs of throttle bodies 5 is mounted with an idle speed control apparatus 10. A bridge portion between the throttle bodies 5 of one of the pairs preferably is integrally formed with a lower housing 11 and the idle speed control apparatus 10 is mounted in such an attitude (inclined diagonally rearward with respect to the front-rear direction of the vehicle) so as to protrude from the lower housing 11 in a direction perpendicular or substantially perpendicular to the axis of the throttle body 5.

The idle speed control apparatus 10 optimizes an amount of air according to a condition of the engine E during an idling operation to supply the air to each cylinder by leading the air from the air cleaner 3 through the intake pipe 2 to a downstream side of the throttle valve 7 in each throttle body 5.

The idle speed control apparatus 10 has a substantially cylindrical upper housing 12 and is integrally formed at its lower end with a protruding flange 12A to be mounted to a lower housing 11. A sealing member 13 is fitted to a lower surface to provide a seal between the flange 12A and the lower housing 11 when the idle speed control apparatus 10 is screwed or otherwise fixed to the lower housing 11. A mounting hole 14 is formed in the upper housing 12 along an axial direction and an inflow pipe 15 is inserted into a lower end of the mounting hole 14. An outer end portion of the inflow pipe 15 bends diagonally toward a connecting pipe 16 of the air cleaner 3 that will be described below and a downstream end portion of a bypass pipe 17 is connected to the outer end portion. In this way, it is possible to introduce clean air (bypass air) from the air cleaner 3 into the idle speed control apparatus 10.

Figure 3:
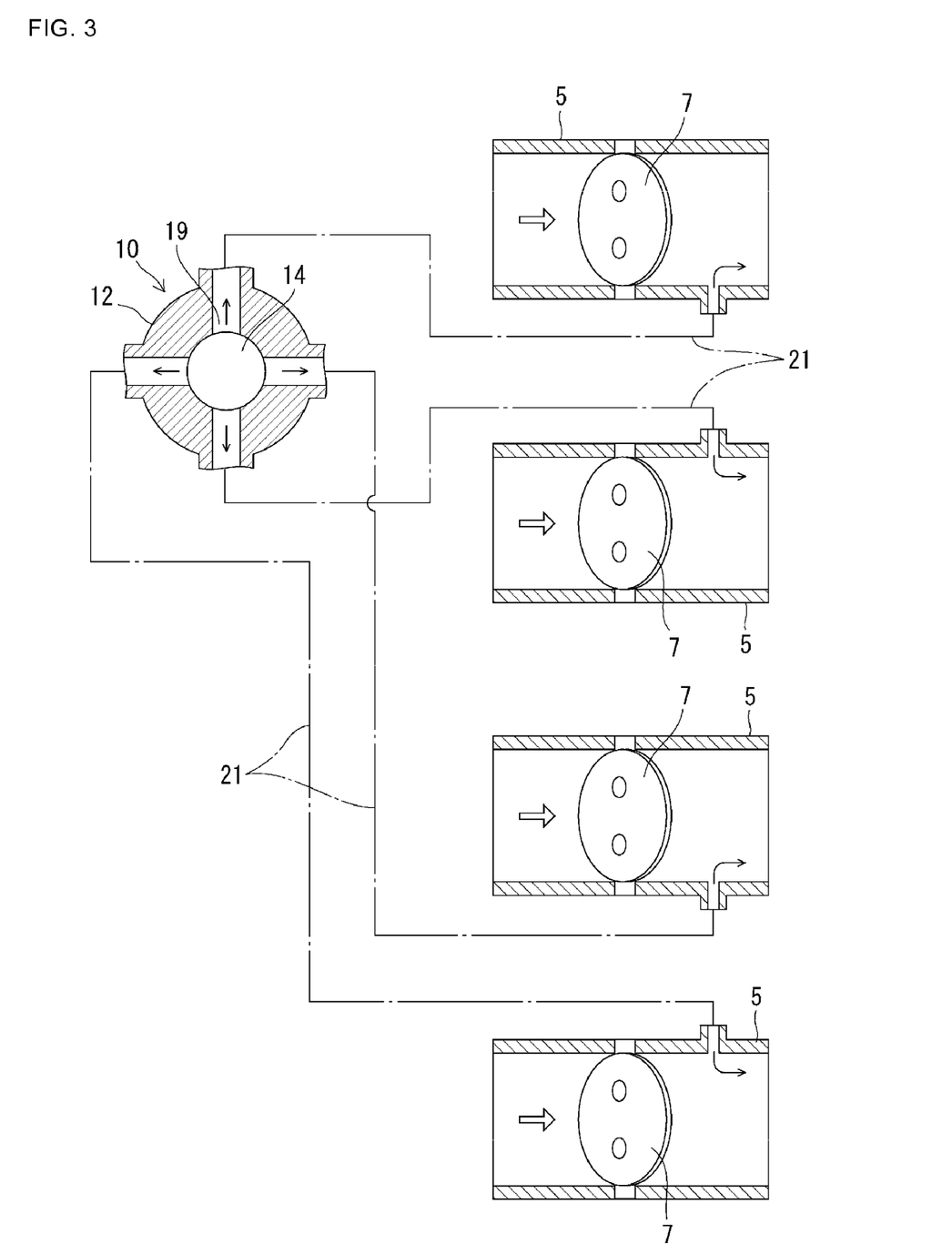
FIG. 3 is a plan sectional view of a measuring portion.

Preferably, four outflow paths 19 arranged at intervals of about 90°, for example, radially extend from the mounting hole 14 to pass through the upper housing 12 and communicate with downstream sides of throttle valves 7 in the bores of the corresponding throttle bodies 5. In this way, as shown in FIG. 3, bypass passages 21 for supplying bypass air from the air cleaner to the downstream sides of the throttle valves 7 in the throttle bodies are formed by routes extending through the bypass pipe 17, the inflow pipe 15, the mounting hole 14, and the respective outflow paths 19 to the downstream sides of the throttle valves 7 in the throttle bodies 5.

From an upper end side of the mounting hole 14, an idle speed controller valve (hereafter referred to as an ISC valve 22) is mounted to the upper housing 12. The ISC valve 22 has a plunger 23 that can be moved along the axial direction of the mounting hole 14 by a stepping motor, for example. The stepping motor adjusts opening degrees of the respective outflow paths 19 by controlling a position of a tip end of the plunger 23 to thereby adjust an amount of air supplied to the downstream side of the respective throttle valves 7 during the idling operation. Operation of the stepping motor of the ISC valve 22 is controlled by the above-mentioned engine control unit (ECU).

Figure 4:
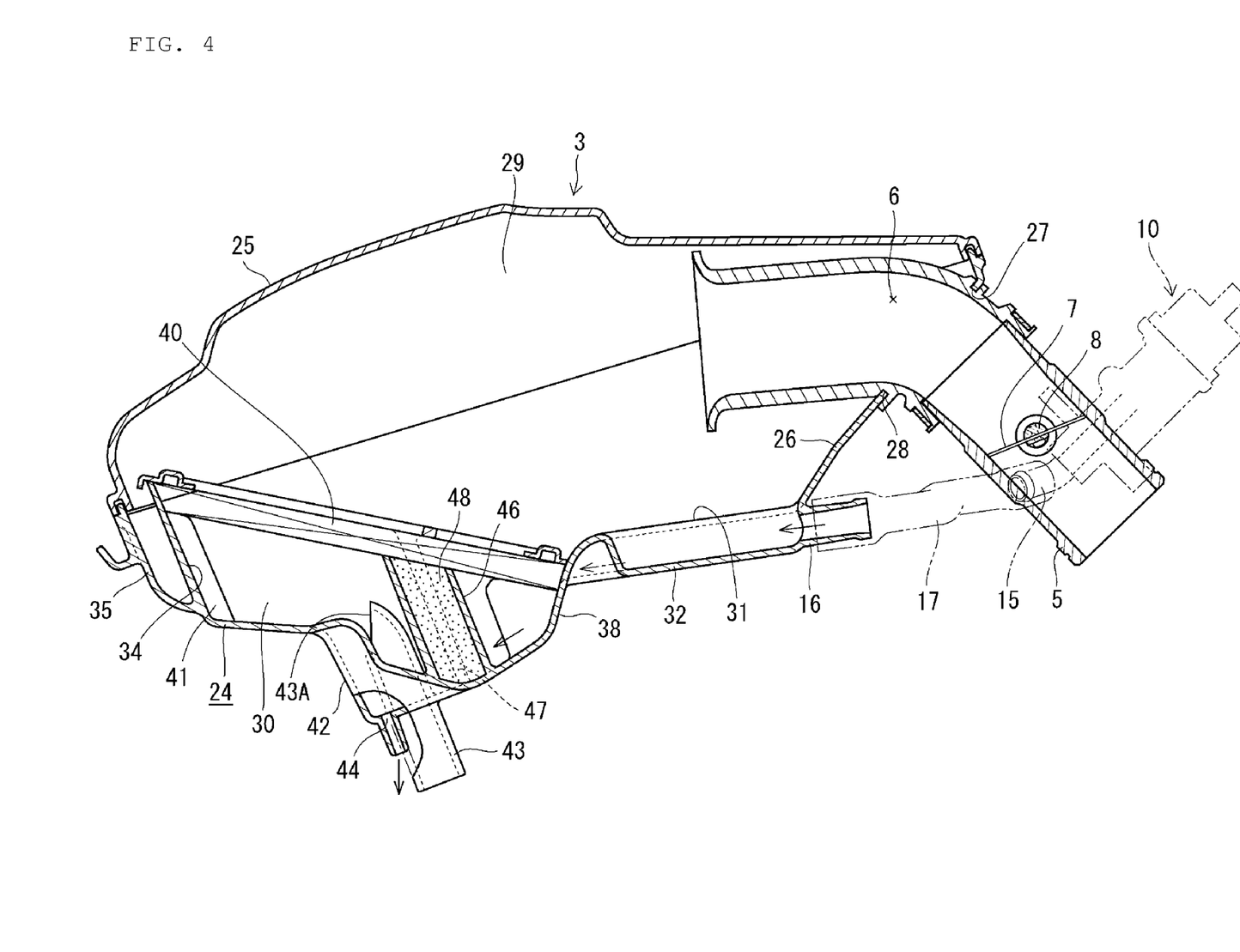
FIG. 4 is a sectional view showing an assembled state around bypass passages.

Next, the air cleaner 3 will be described (see FIGS. 4 and 5 mainly). The air cleaner 3 preferably includes a casing body 24 and a lid 25 both of which are preferably made of synthetic resin material, for example. The casing body 24 preferably has a box-shaped configuration that opens upward and can be opened and closed by the lid 25. The air cleaner 3 is mounted in an inclined attitude where its rear is slightly higher as a whole.

A rear wall 26 of the casing body 24 is arranged to face diagonally downward, front ends of the intake pipes 2 are inserted into the rear wall 26, and the intake pipes 2 and the throttle bodies 5 are arranged in inclined attitudes so as to be inclined rearward toward the engine E.

Figure 5:
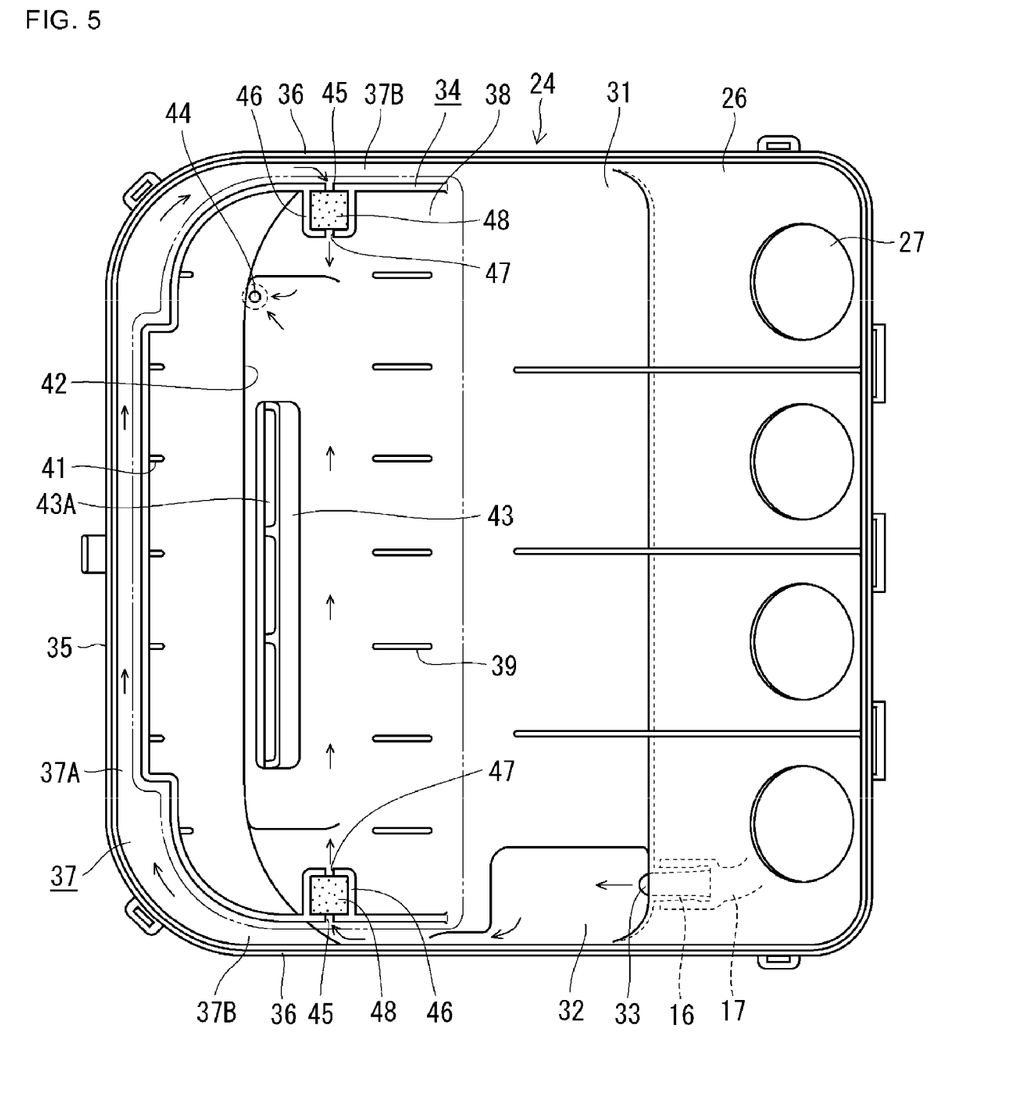
FIG. 5 is a plan sectional view of an air cleaner.

The rear wall 26 of the casing body 24 is formed with four insertion holes 27 arranged side by side at equal intervals in a vehicle width direction as shown in FIG. 5. The intake pipes 2 are preferably made of soft material having flexibility and are press-fitted into the respective insertion holes 27. By fitting an opening edge of each of the insertion holes 27 in a positioning groove 28 preferably formed as an annular recessed portion in an outer peripheral surface of each of the intake pipes 2 in a position close to an end portion connected to the throttle body 5, the intake pipe 2 is positioned in the axial direction with a predetermined length of its protruding into a clean-side chamber 29 (described below) in the air cleaner 3.

A surface extending forward from a lower edge of the rear wall 26 in the casing body 24 defines an intermediate wall 31 gently sloping down and forward from the rear wall 26. The intermediate wall 31 is recessed downward to form a bulging portion 32 on one end side in the vehicle width direction (a lower side in FIG. 5 that is opposite to a side where the idle speed control apparatus 10 is disposed) and the bulging portion 32 preferably has the same inclination as the intermediate wall 31. A lead-out port 33 opens in a rear surface of the bulging portion 32 and the above-mentioned connecting pipe 16 to which an upstream end of the bypass pipe 17 is connected preferably is formed integrally around the lead-out port 33 to protrude rearward.

As shown in FIG. 6, the bypass pipe 17 is installed under and across an area, in the vehicle width direction, where the respective intake pipes 2 are arranged side by side while slightly meandering with a suitable degree of slack. The bypass pipe 17 is arranged so that its downstream end portion connected to the idle speed control apparatus 10 is higher than its upstream end portion connected to the air cleaner 3. Moreover, a portion of the bypass pipe 17 between its opposite connected end portions is inclined downward throughout its length toward the air cleaner 3 without curving and slacking in a height direction.

A front half of a bottom surface of the casing body 24, i.e., a portion ahead of a front edge of the intermediate wall 31 is depressed with respect to a rear half. Here, a partition wall 34 shown in FIG. 5 is arranged to rise. The partition wall 34 extends in the vehicle width direction along a front wall 35 of the casing body 24, curves rearward at corner portions, and extends parallel or substantially parallel along opposite side walls 36 of the casing body 24 to thereby define a substantially U-shape as a whole in a plan view. The partition wall 34 is properly spaced from an inner wall of the casing body 24 throughout its length to define a channel 37. The channel 37 includes a front channel 37A extending along the vehicle width direction and a pair of side channels 37B extending toward the rear of the vehicle from opposite end portions of the front channel 37A.

On the bottom surface of the casing body 24, a rising wall 38 extends while inclining forward from the front edge of the intermediate wall 31. On the rising wall 38, a plurality of receiving chips 39 are arranged side by side preferably at substantially equal intervals in the vehicle width direction and each receiving chip 39 preferably has a shape of a substantially triangular flat plate protruding forward. An element 40 of the air cleaner 3 is fitted at its left and right opposite side edge portions and its front edge portion inside the partition wall 34 with its rear edge portion abutting on a wall surface of the rising wall 38. The front edge portion of the element 40 is placed on a plurality of support chips 41 protruding in rib shapes from an inner surface of a front edge of the partition wall 34. The rear edge portion of the element 40 is placed on the respective receiving chips 39. In this way, as shown in FIG. 4, the whole element 40 is supported with an inclination substantially equal to the inclination of the intake pipes 2 as in a side view of the vehicle. By supporting the element 40 as described above, the inside of the air cleaner 3 is divided into a dirty-side chamber 30 (first chamber) surrounded with the element 40, the partition wall 34, and the bottom surface of the casing body 24 and the rest, i.e., a clean-side chamber 29 (second chamber).

Because the whole element 40 can be seen when the lid 25 is detached and a peripheral edge of the element 40 is away from the side walls in the casing body 24, it is easy to pinch the peripheral edge portion of the element 40 with fingers, which facilitates attachment and detachment of the element 40. Ease of removal of snow that entered the dirty-side chamber 30 is extremely advantageous in consideration of circumstances specific to the snowmobile where snow and moisture stirred up during traveling tends to enter the air cleaner.

The bottom surface of the dirty-side chamber 30 extends from a lower edge of the rising wall 38 while inclining forward and then rises substantially at right angles to the bottom surface to form a water receiving wall 42. Provided at a central portion of the bottom surface of the dirty-side chamber 30 in the vehicle width direction is an outside air intake cylinder 43 through which outside air is taken into the air cleaner 3 and this outside air intake cylinder 43 is provided close to the water receiving wall 42. The outside air intake cylinder 43 preferably has an angular cylindrical shape that is thin in a direction along the water receiving wall 42 and protrudes both outside and inside the casing body 24. The outside air intake cylinder 43 opens on both the inside and outside and an opening surface 43A on the inside opens forward at such an angle so as to be substantially at right angles to a surface of the element 40. A boundary edge where the bottom surface of the dirty-side chamber 30 and the water receiving wall 42 intersect each other is in the lowest position (naturally, lower than a position where the connecting pipe 16 is formed) in an installed state of the air cleaner 3. A drain hole 44 for drainage is provided in the bottom surface of the dirty-side chamber 30 in a position close to the above-described boundary edge and close to one end portion in the vehicle width direction (close to the upper end portion in FIG. 5).

Although four sides of the above-described bulging portion 32 in the vehicle front-rear direction and the vehicle width direction are surrounded with wall surfaces, there is a small gap between the front wall and the side wall 36 of the casing body 24 through which the bulging portion 32 communicates with one of the side channels 37B. A portion where one side channel 37B communicates with the bulging portion 32 is preferably inclined forward and flush with the rising wall 38 and the bottom surface of the dirty-side chamber 30 with the same inclination. However, the bottom surface of the casing body 24 is arranged to rise forward so that the opposite side channels 37B diagonally rise from midpoints in the front-rear direction and extend to the front channel 37A.

The partition wall 34 is formed throughout its height with vertical lead-in-side slits 45 in positions corresponding to the portions of the bottom surfaces of the opposite side channels 37B where the bottom surfaces switch from forward inclining to forward rising, i.e., the lowest portions of the channel 37 in the installed state of the air cleaner 3. On the inner surfaces of the positions of the partition wall 34 formed with the lead-in-side slits 45, a pair of left and right housing cylinders 46 in shapes of angular cylinders along the height direction is arranged vertically. A lead-out-side slit 47 is arranged to extend along the height direction to pass through each of the housing cylinders 46 in a position facing the lead-in-side slit 45. Inside each of the housing cylinders 46, a sponge-like filter member 48 having air permeability and water permeability is detachably fitted.

The intake system of the first preferred embodiment is preferably constructed as described above. During cold starting of the engine E, the outside air is taken into the dirty-side chamber 30 through the outside air intake cylinder 43 of the air cleaner 3 due to negative pressure caused in the cylinders. The outside air is filtered through the inside element 40 and filter member 48 and enters the clean-side chamber 29. Then, a portion of the air passes through the bypass pipe 17, is measured by the ISC valve 22, and then is supplied to each cylinder. The ISC valve 22 adjusts opening degrees of respective communication holes 19 by displacing the plunger 23 in the axial direction based on a known controlling method by the ECU (not shown). In this way, for example, the lower a temperature of cooling water of the engine E is, the higher the idle speed is controlled to be to thereby shorten warm-up operation time.

If the vehicle travels on a snow covered path, for example, stirred-up snow and moisture may directly enter the air cleaner 3. In this case, bypass air containing a large amount of moisture enters the bypass pipe 17 from the clean-side chamber 29 and reaches the respective cylinders via the above-described routes. Then, moisture that adheres to the inner wall surface of the bypass passages 21 may be gathered into the bypass pipe 17. In this case, if the water that entered the bypass pipe 17 happens to partially block the pipe 17, the bypass air is not supplied to the engine. In the present preferred embodiment, however, the bypass pipe 17 is arranged so that its end portion connected to the inflow pipe 15 on the throttle body 5 side is in a higher position and its end portion connected to the connecting pipe 16 on the air cleaner 3 side is in a lower position and therefore the water in the bypass pipe 17 flows down toward the air cleaner 3 along the inclination of the pipe 17. Then, the water flows through the lead-out port 33 and enters the bulging portion 32 in the clean-side chamber 29. After that, the water flows forward along the inclination of the bulging portion 32 and flows into the one (lower in FIG. 5) side channel 37B. The water is subsequently gathered to the lowest position of the side channel 37B where the lead-in-side slit 45 opens and therefore the water enters the dirty-side chamber 30 through the slit 45, the filter member 48, and the lead-out-side slit 47.

Water that enters the one side channel 37B as the whole air cleaner 3 is shaken during traveling of the vehicle flows through the front channel 37A and reaches the other side channel 37B. After that, the water that has reached the other side channel 37B similarly enters the dirty-side chamber 30 through the filter member 48.

In the dirty-side chamber 30, the boundary edge where the bottom surface and the water receiving wall 42 intersect with each other is in the lowest position in the installed state of the air cleaner 3. Therefore, the water is gathered to this position and is drained out through the drain hole 44 open in this position.

As described above, according to the present preferred embodiment, the water that has entered the bypass pipe 17 does not stay there and flows down toward the air cleaner 3 along the forward inclination of the pipe 17. Then, the water is gathered into the dirty-side chamber 30 and drained out at the end. Therefore, the bypass passage 21 is not blocked by the water and it is possible to reliably carry out the idle-speed control. As described above, in the present preferred embodiment, no special water reservoir used in the prior art needs to be provided, and instead the existing air cleaner 3 is utilized to gather water. Therefore, no special member for collecting water needs to be added and the structure of the intake system can remain simple.

Because the bypass pipe 17 is preferably connected to the same wall surface (the rear wall) to which the intake pipe 2 is connected in the air cleaner 3 in the present preferred embodiment, the pipes can be gathered into one place and it is possible to ensure a large space around the air cleaner 3. Moreover, because the bypass pipe 17 is connected to the surface opposite to the engine E, it is possible to shorten the bypass pipe 17.

Furthermore, because the element 40 of the air cleaner 3 is retained in the rearward inclining attitude with its rear end portion facing the engine E in the lower position, the whole rear half portion of the air cleaner 3 can be used as the clean-side chamber 29. As a result, the end portion to which the bypass passages 21 are connected can be set in the lowest possible position by taking advantage of the total height of the air cleaner 3. Moreover, by further lowering the connected position by providing the bulging portion 32 as in the present preferred embodiment, it is possible to obtain a greater height difference from the end portion connected to the throttle bodies 5. In this way, it is possible to reliably prevent the water from staying in the bypass passage 21. Because the element 40 is arranged in the inclined attitude, it is easy to detach as described above.

Since the bypass pipe 17 is installed below the intake pipes 2 and is connected to the air cleaner 3 from above, the intake pipes are connected after the bypass pipe 17 is connected. In this case, the bypass pipe 17 is preferably made of flexible material, which provides flexibility in operation of connecting the intake pipes 2. Moreover, if the bypass pipe 17 is installed and arranged so as to meander in the horizontal direction as in the present preferred embodiment, it is possible to provide some slack to the meandering portion, which further facilitates the connecting operation.

Other Preferred Embodiments

The present invention is not limited to the preferred embodiment explained by the above description and the drawings. The following preferred embodiments are included in the technical scope of the invention, for example, and the present invention can be carried out by making various changes including those described below without departing from the general idea of the present invention.

It is essential only that the bypass pipe 17 be generally inclining toward the air cleaner 3 and the bypass pipe 17 may include horizontal portions in its mid portions.

The position of the air cleaner 3 where it is connected to the bypass pipe 17 is not limited to the rear wall 26 but may be the side wall 36.

Although the whole air cleaner 3 is preferably installed in the forward inclining attitude in a preferred embodiment described above, it may be installed in a horizontal attitude.

Although the bypass pipe 17 is preferably installed between the air cleaner 3 and the throttle body 5 to extend across the respective intake passages 6 in a preferred embodiment described above, it is possible to install the bypass pipe 17 along the longitudinal direction of the intake passages 6.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An engine intake system comprising:
an intake passage arranged to connect an air cleaner and an engine and through which air flows downward toward the engine;
a throttle body provided in the intake passage; and
a bypass passage arranged to connect a downstream side of a throttle valve provided in the throttle body and the air cleaner; wherein
the bypass passage is arranged such that a first end portion connected to the air cleaner is in a lower position than a second end portion connected to the throttle body and such that a portion located between the first and second end portions is substantially inclined downward toward the air cleaner.

2. An engine intake system according to claim 1, wherein the first end portion of the bypass passage connected to the air cleaner is disposed at a bottom portion of the air cleaner and on a surface on a same side as a side surface to which an end portion of the intake passage is connected.

3. An engine intake system according to claim 1, wherein an inside of the air cleaner is divided by an element arranged to filter air into a first chamber into which outside air is introduced and a second chamber to which the intake passage is connected, and the first end portion of the bypass passage connected to the air cleaner is located on the second chamber side.

4. An engine intake system according to claim 3, wherein the second chamber is located on a side facing the engine.

5. An engine intake system according to claim 3, wherein the element has a substantially flat shape and is housed in the air cleaner with an inclined attitude with respect to a horizontal plane.

6. An engine intake system according to claim 5, wherein the element is housed in the air cleaner with a downward inclined attitude toward an end portion facing the surface on which the connected first end portion of the bypass passage is disposed.

7. An engine intake system according to claim 5, wherein the engine is mounted in a vehicle, an axis of a cylinder is inclined diagonally toward a rear portion of the vehicle, an axis of the element having the substantially flat shape is inclined diagonally toward a front portion of the vehicle, and the bypass passage is disposed in an area of an angle between the axis formed by the cylinder and the axis defined the substantially flat surface of the element in a side view of the vehicle.

8. An engine intake system according to claim 1, wherein a hole is formed in a bottom surface of the air cleaner and in a position lower than the first end portion of the bypass passage connected to the air cleaner.

9. An engine intake system according to claim 8, wherein an inside of the air cleaner is divided by an element arranged to filter air into a first chamber into which outside air is introduced and a second chamber to which the intake passage is connected, and the hole is positioned in the first chamber, a filter member having water permeability is located between the first chamber and the second chamber and different from the element, and a bottom surface of the second chamber includes a channel arranged to guide water that flows in from the bypass passage to the filter member.

10. An engine intake system according to claim 1, wherein the bypass passage is flexible and is disposed below the intake passage.

11. An engine intake system according to claim 10, wherein the engine has a plurality of substantially parallel cylinders, the first end portions of the bypass passages connected to the throttle bodies and the second end portion of the passages on the air cleaner side are spaced from each other in a direction in which the cylinders are arranged in a plan view of the vehicle, and the bypass passages are flexibly deformable to connect varying lengths between the throttle bodies and the air cleaner.

* * * * *